United States Patent [19]

Curtis

[11] 4,034,069

[45] July 5, 1977

[54] METHOD OF PREPARING ARSENIC TRIFLUORIDE

[75] Inventor: M. David Curtis, Ann Arbor, MI

[73] Assignee: Hooker Chemicals & Plastics Corporation, Niagara Falls, N.Y.

[22] Filed: Aug. 20, 1975

[21] Appl. No.: 606,044

[52] U.S. Cl. .............................. 423/489; 423/470; 423/491; 423/497; 423/499; 423/DIG. 12
[51] Int. Cl.$^2$ ......................................... C01B 27/00
[58] Field of Search ............. 423/489, 491, 659 A, 423/497, 499

[56] References Cited

UNITED STATES PATENTS

| 292,742 | 7/1943 | Beck et al. ................. 423/659 A |
| 3,684,443 | 8/1972 | Zirngibl et al. ................. 423/659 A |
| 3,806,581 | 4/1974 | Grimes et al. ................. 423/499 |

FOREIGN PATENTS OR APPLICATIONS

| 934,093 | 8/1963 | United Kingdom ........... 423/659 A |

OTHER PUBLICATIONS

J. W. Mellor's, "A Comp. Treatise on Inorg. and Theo. Chem.," vol. 9, 1929, pp. 241 and 242, Longmans, Green & Co., N.Y.
J. W. Mellor's, "A Comp. Treatise on Inorg. and Theo. Chem.," vol. 2, 1922, p. 66, Longmans, Green & Co., N.Y.
"Treatise on Inorganic Chemistry," vol. 1, 1956 Ed., by H. Remy, p. 658, Elsevier Pub. Co., N.Y.
"Table of Periodic Properties of the Elements" by Sargent—Welch, 1968, Sargent—Welch Sc. Co., Chicago, Ill.

Primary Examiner—Edward Stern
Attorney, Agent, or Firm—Peter F. Casella; William J. Crossetta, Jr.; William G. Gosz

[57] ABSTRACT

A process is disclosed for the preparation of arsenic trifluoride which comprises reacting arsenic trichloride with one or more molten fluoride salts.

9 Claims, No Drawings

METHOD OF PREPARING ARSENIC TRIFLUORIDE

BACKGROUND OF THE INVENTION

Commercial processes for the production of organic fluorides have been based on the halogen exchange of an organic chloride with arsenic trifluoride as illustrated by the following general equation:

$$3RCl + AsF_3 \rightarrow 3RF + AsCl_3$$

(R being an organic moiety)

The organic fluoride is usually purified by standard procedures such as extraction or distillation. Such process may require the removal and storage of the arsenic trichloride.

As is evident from the above reaction scheme, arsenic trichloride is generated in an amount proportional to the amount of arsenic trifluoride consumed. However, arsenic trichloride has limited resale value, and disposal presents a costly and time-consuming process. Consequently, it is desirable to utilize arsenic trichloride as a starting material in any economical process for producing arsenic trifluoride based upon the aforesaid reaction.

Conventional procedures for manufacturing arsenic trifluoride usually employ either arsenic trioxide or arsenic trichloride as starting materials, and may or may not include a catalysis agent.

For example, arsenic trioxide, ($As_2O_3$), may be reacted with a fluorinating agent, such as hydrogen fluoride, (HF), to produce arsenic trifluoride, ($AsF_3$).

$$As_2O_3 + 6HF \rightarrow 2AsF_3 + 3H_2O$$

Calcium fluoride, ($CaF_2$), and concentrated sulfuric acid, ($H_2SO_4$), may also be used as starting materials with a similar effect:

$$3CaF_2 + 3H_2SO_4 \rightarrow 6HF + 3CaSO_4$$
$$As_2O_3 + 6HF \rightarrow 2AsF_3 + 3H_2O$$

Both of these methods are accompanied by several economic and time-consuming disadvantages: extensive distillation of reaction products is required to purify the arsenic trifluoride; hydrogen fluoride, a highly corrosive substance, requires special equipment and handling procedures; and hydrogen fluoride, with a low boiling point of 19.5° Centigrade, must be shipped and stored in pressure-tested vessels.

In addition, hydrogen fluoride gas is highly toxic by ingestion and inhalation, as well as strongly irritant to the eyes, skin and mucous membranes, and therefore represents a constant industrial health and safety hazard.

Another process reacts arsenic trichloride, ($AsCl_3$), with ammonium fluoride, ($NH_4F$), in the presence of liquid sulfur dioxide, ($SO_2$), to generate arsenic trifluoride:

$$AsCl_3 + 3NH_4F \xrightarrow{SO_2} AsF_3 + 3NH_4Cl \quad (1)$$

A disadvantage of this method is the required presence of sulfur dioxide, a highly toxic and irritating substance.

SUMMARY OF THE INVENTION

A rapid and convenient process for utilizing arsenic trichloride in the preparation of arsenic trifluoride has been discovered wherein arsenic trichloride is reacted with a molten fluoride salt, or a molten mixture of fluoride salts and chloride salts. The arsenic trichloride is passed through a bath of said molten salts and arsenic trifluoride vapor is collected and condensed by cooling the off-gas. The instant process does not utilize hydrogen fluoride as a primary or intermediate reactant or product.

DETAILED DESCRIPTION

A fluoride salt, a mixture of fluoride salts, or a mixture of fluoride and chloride salts is heated in a reaction vessel to at least the fusion point. The molten salt solution is maintained at a temperature of from about 250° Centigrade to about 1500° Centigrade. In a preferred embodiment of the invention, the reaction is maintained at a temperature from about 300° Centigrade to about 400° Centigrade.

The fluoride source of this invention generally is selected from the group consisting of the alkali metal fluorides, alkaline earth metal fluorides, and mixtures thereof. Preferred fluorides are those selected from the group consisting of lithium fluoride, sodium fluoride, potassium fluoride, magnesium fluoride, calcium fluoride, strontium fluoride, barium fluoride, and mixtures thereof. Sodium fluoride, calcium fluoride, and mixtures thereof are the most preferred salts. The fluoride source may include a single fluoride salt, or a mixture of two or more different fluoride salts in any suitable proportion.

It has been found that the fusion point of the fluoride salt bath can be lowered by the addition of metal chlorides. The chlorides found useful for this purpose include the following, as well as mixtures thereof: lithium chloride, sodium chloride, potassium chloride, calcium chloride, and zinc chloride. Aluminum chloride may also be used in combination with sodium chloride or potassium chloride. The metal chlorides appear to remain unreacted in the molten mixture, and do not significantly contaminate the product gas which comprises high purity arsenic trifluoride. Consequently, heating costs savings obtained by using metal chlorides in the mixture with the fluorine salts would not be at the expense of increased costs of purifying the off-gas. This result is particularly advantageous as the economics in heating costs can be considerable for a sustained, high temperature reaction.

The instant invention is based on the halogen exchange of arsenic trichloride with a fluoride salt. The generalized reaction can be expressed by:

$$AsCl_3 + 3MF \rightarrow AsF_3 + 3MCl$$
$$2AsCl_3 + 3NF_2 \rightarrow 2AsF_3 + 3NCl_2$$

where M, is an alkali metal, and N is an alkaline earth metal.

As is evident from the equations immediately preceding, the process of this invention occurs in the absence of the highly corrosive or toxic acids of many of the prior art processes. In addition, the product gas, arsenic trifluoride, is highly pure, making it unnecessary to use the repeated distillation and separation techniques of the prior art.

In a particular embodiment of the instant invention, arsenic trichloride, in liquid form, is bubbled through a molten salt bath, usually with a stream of nitrogen. Upon contact with the bath, the arsenic trichloride is vaporized and reacts with the fluoride salts. The off-gas may then be condensed at room temperature, or in a cooling environment.

The process of this invention may be carried out experimentally in any reactor which will maintain the integrity of reaction. Arsenic trifluoride is highly reactive, however, and will react with, or "etch", various materials which may produce undesirable reaction products, necessitating removal from the product stream. Consequently, a preferred reactor lining material would be graphite or nickel, or some such material resistant to chemical attack by arsenic trifluoride.

This invention is illustrated by, but not limited to, the following Example.

EXAMPLE 1

700 grams of zinc chloride, 328 grams of potassium chloride, and 120 grams of sodium fluoride were charged to a molten salt reactor equipped with a dropping funnel, a condenser, and a stirrer. 50 grams of arsenic trichloride was then added to the mixture, vaporized, and swept through the molten salt with a slow stream of nitrogen. The melt was held at 300° Centigrade. 24 grams of arsenic trifluoride of 93 percent purity was collected in the product trap. Quantities of silicon tetrafluoride gas were also produced from attack of the arsenic trifluoride on the glass walls.

We claim:

1. A process for the production of arsenic trifluoride which comprises reacting arsenic trichloride with at least one molten fluoride salt selected from the group consisting of alkali metal fluorides, alkaline earth metal fluorides and mixtures thereof in the presence of at least one molten chloride salt.

2. The process of claim 1 wherein the molten fluoride salt is selected from the group consisting of lithium fluoride, sodium fluoride, potassium fluoride, magnesium fluoride, calcium fluoride, strontium fluoride, and barium fluoride.

3. The process of claim 2 wherein the fluoride salt is sodium fluoride.

4. The process of claim 2 wherein the fluoride salt is calcium fluoride.

5. The process of claim 1 wherein said molten chloride salt is selected from the group consisting of lithium chloride, sodium chloride, potassium chloride, calcium chloride, and zinc chloride.

6. The process of claim 1 wherein the reaction is maintained at a temperature of from about 250° Centigrade to about 1500° Centigrade.

7. The process of claim 1 wherein the reaction is maintained at a temperature of from about 300° Centigrade to about 400° Centigrade.

8. The process of claim 1 wherein the arsenic trichloride is bubbled through the molten fluoride salt with a stream of nitrogen gas.

9. The process of claim 1 wherein the reaction occurs in the presence of aluminum chloride and a chloride salt selected from the group consisting of sodium chloride and potassium chloride.

* * * * *